(12) United States Patent
Barnes et al.

(10) Patent No.: US 8,554,975 B2
(45) Date of Patent: Oct. 8, 2013

(54) MASS STORAGE DEVICE AND MASS STORAGE ASSEMBLY

(75) Inventors: Clarke David Barnes, Austin, TX (US); Alonzo Ramirez, Manchester, NH (US)

(73) Assignee: Celestica International Inc., Toronto, Ontario (CA)

( * ) Notice: Subject to any disclaimer, the term of this patent is extended or adjusted under 35 U.S.C. 154(b) by 250 days.

(21) Appl. No.: 12/822,003

(22) Filed: Jun. 23, 2010

(65) Prior Publication Data

US 2010/0332710 A1 Dec. 30, 2010

Related U.S. Application Data

(60) Provisional application No. 61/213,592, filed on Jun. 23, 2009.

(51) Int. Cl.
 *G06F 13/14* (2006.01)
 *G06F 13/38* (2006.01)

(52) U.S. Cl.
 CPC .................................. *G06F 13/385* (2013.01)
 USPC .......................................... 710/305; 710/74

(58) Field of Classification Search
 USPC ........ 710/1–2, 8–19, 62–64, 72–74, 300–317
 See application file for complete search history.

(56) References Cited

U.S. PATENT DOCUMENTS

| | | | |
|---|---|---|---|
| 7,068,500 B1 * | 6/2006 | Beinor et al. | 361/679.33 |
| 7,216,195 B1 * | 5/2007 | Brown et al. | 710/316 |
| 7,334,075 B2 * | 2/2008 | Marushak et al. | 710/316 |
| 7,542,210 B2 * | 6/2009 | Chirieleison, Sr. | 359/630 |
| 7,630,211 B2 * | 12/2009 | Bonds et al. | 361/788 |
| 7,996,575 B2 * | 8/2011 | Hall et al. | 710/8 |
| 8,032,785 B1 * | 10/2011 | Brown et al. | 714/6.32 |
| 2004/0083325 A1 * | 4/2004 | Rabinovitz et al. | 710/315 |
| 2005/0138261 A1 | 6/2005 | Marushak et al. | |
| 2008/0183917 A1 * | 7/2008 | Cagno et al. | 710/33 |
| 2009/0177805 A1 * | 7/2009 | Nemazie et al. | 710/5 |
| 2010/0089435 A1 * | 4/2010 | Lockenhoff | 136/246 |
| 2010/0235559 A1 * | 9/2010 | Chen | 710/300 |
| 2010/0241799 A1 * | 9/2010 | Schuette | 711/104 |
| 2011/0286691 A1 * | 11/2011 | Hopkins et al. | 385/14 |

FOREIGN PATENT DOCUMENTS

WO WO 2007/050152 A1 5/2007

OTHER PUBLICATIONS

Chitiu, Adrian; International Search Report from corresponding PCT Application No. PCT/CA2010/000954; search completed Oct. 20, 2010.

* cited by examiner

*Primary Examiner* — Raymond Phan (57) ABSTRACT

There is disclosed a mass storage device (such as a hard disk drive) comprising an input connector for electrically receiving both a first set of data signals and a second set of data signals. The first set of data signals are used to store or retrieve information on the mass storage device, whereas the second set of data signals are electrically conducted to an output connector on the mass storage device. When an adjacent mass storage device is connected to the output connector, the second set of data signals are used to store or retrieve information on this adjacent mass storage device.

15 Claims, 6 Drawing Sheets

MASS STORAGE DEVICE AND MASS STORAGE ASSEMBLY

CROSS REFERENCE TO RELATED APPLICATIONS

This application claims priority from U.S. Provisional Application No. 61/213,592 filed on Jun. 23, 2009; the contents of which are incorporated herein by reference.

FIELD OF THE INVENTION

The present invention relates generally to mass storage devices, such as hard disk drives, and their carriers.

DESCRIPTION OF THE PRIOR ART

Hard disk drives (HDDs) are non-volatile storage units used to store digital data. HDDs are found in many computing systems, such as in personal computers, servers, storage enclosures, blades, and other computing devices. For example, a storage enclosure typically includes a plurality of HDDs, which are used by host(s) during operation to store digital information.

One example of a known storage enclosure has a plurality of HDDs. The storage enclosure comprises a chassis having a front portion and a back portion. A plurality of carriers are removably housed in the front portion of the chassis and each carrier houses two HDDs. Each carrier can be removed or inserted into the front portion of the chassis using an ejector handle and the carrier and HDDs provide a mass storage assembly. When the carrier is properly inserted into the front portion of the chassis, each HDD electrically connects to a midplane in the storage enclosure, which allows one or more controllers in the storage enclosure to access each HDD. Digital data may then be retrieved from or transmitted to each HDD. Controllers, as well as other computing and control equipment, are typically housed in the back portion of the chassis.

A typical HDD used in such a storage enclosure is configured to communicate with a controller according to the Serial Attached SCSI (SAS) protocol and/or the Serial ATA (SATA) protocol. SAS and SATA are data transfer technologies well known in the art and are used for moving data to and from mass storage devices such as HDDs. Such HDDs are therefore manufactured with either a SAS connector or a SATA connector. The connector electrically connects to a midplane and is driven by a controller. A SAS connector comprises 32 pins or fingers that are electrically driven according to the SAS protocol in order to transfer data to and from the HDD. As is known in the art, a SAS connector is backwards compatible with SATA signals. For this reason, SAS connectors are more versatile than SATA connectors since a SATA connector can only accommodate SATA signals and not SAS signals, whereas a SAS connector can accommodate either SAS signals or SATA signals.

The chassis of a server or storage enclosure is generally manufactured according to industry standard physical sizes. For example, a chassis is typically designed to fit within a 19" frame, or rack. The chassis width is determined by 19" rackmount standards and its height is measured in "U's", where each "1U" represents 1.75". For a given chassis size, it is desired to place as many components in the chassis as possible. Therefore, there is a need for compactly fitting HDDs within the housing of the chassis.

To facilitate compact storage, it is known for the frame of the carrier to support a printed circuit board (PCB) that extends longitudinally along the length of the carrier and beneath both HDDs. Each HDD has a single SAS connector respectively which physically and electrically engages a dedicated socket on the PCB. Conductive pathways on the PCB independently electrically connect each SAS connector to respective dedicated pins on a high speed connector. The high speed connector is mounted on the end of the PCB and is removably connectable to a midplane in the storage enclosure.

In use, the carrier is inserted into a dedicated slot in the front portion of the chassis. The frame of the carrier is received in the slot, and as the carrier is pushed into the slot, the high speed connector mounted on the end of the PCB physically, and therefore electrically, engages a dedicated socket on the midplane in the storage enclosure. A controller electrically connected to the opposite side of the midplane can then be configured to drive one or both of the HDDs using the SAS or SATA protocol and therefore store or retrieve information.

Although the dual HDD carrier is relatively simple to manufacture, the provision of the PCB increases the size of the carrier and therefore places a limit on the number of carriers (and hence the number of HDDs) that can be placed in a given chassis. Also, the PCB and high speed connector add to the parts that are required for manufacturing the carrier. This increases manufacturing cost, as well as increases the number of components that may need to be repaired or replaced during use of the carrier.

In another prior art arrangement, the frame of the carrier directly supports HDDs. A small PCB or "paddle board" electrically connects a SAS connector of a HDD to dedicated pins on a high speed connector. A flex circuit extends along the inner portion of the frame immediately adjacent the HDD. One end of the flex circuit physically and electrically connects to a SAS connector of another HDD, while the other end of the flex circuit physically and electrically connects to conductive pathways on the paddle board, which form an electrical connection with dedicated pins on the high speed connector. Both HDDs are therefore electrically connected to a high speed connector without the provision of a PCB extending longitudinally along the length of the carrier and beneath both HDDs. Instead, the paddle board and flex circuit are used to form an electrical connection between the HDDs and the high speed connector.

In use, the carrier is inserted into a dedicated slot in the front portion of the chassis. The frame of the carrier is received in the slot, and as the carrier is pushed into the slot, the high speed connector physically, and therefore electrically, engages a dedicated socket on the midplane in the storage enclosure. A controller electrically connected to the opposite side of the midplane can then be configured to drive one or both of the HDDs using the SAS or SATA protocol and therefore store or retrieve information. Electrical signals transmitted between the high speed connector and the SAS connector of a HDD will travel along dedicated conductive pathways on paddle board, whereas electrical signals transmitted between the high speed connector and the SAS connector of the other HDD will travel along the flex circuit.

Such a carrier is physically smaller due to the provision of the flex circuit, which eliminates the need for the relatively bulky PCB that is used in other prior art carriers. Therefore more carriers (and hence more HDDs) can be packed into a given chassis. However, a flex circuit is expensive and substantially increases the manufacturing cost of the carrier. Therefore, although such a carrier offers space savings over a carrier using a PCB, it is more expensive to manufacture. Also, the paddle board, high speed connector, and flex circuit amount to additional parts that are required for manufacturing the carrier. Not only does this increase the manufacturing cost, but it also increases the number of components that may need to be repaired or replaced during use of the carrier.

It is an object of the present invention to obviate or mitigate at least some of the above-described disadvantages.

SUMMARY OF THE INVENTION

In general terms, the present invention provides a mass storage device comprising an input connector for electrically receiving both a first set of data signals and a second set of data signals. The first set of data signals are used to effect storage and retrieval of information on the mass storage device, whereas the second set of data signals are electrically conducted to an output connector on the mass storage device. When an adjacent mass storage device is connected to the output connector, the second set of data signals are used to effect storage and retrieval of information on this adjacent mass storage device.

Preferably, in one embodiment the mass storage device is a hard disk drive (HDD) having an input connector that accommodates two sets of signals, either set being SAS or SATA signals. One set of SAS or SATA signals is used to drive the HDD, whereas the other set of SAS or SATA signals is forwarded to an output connector on the HDD, which can be electrically connected to an input connector of an adjacent HDD.

BRIEF DESCRIPTION OF THE DRAWINGS

Embodiments of the invention will now be described by way of example only with reference to the accompanying drawings, in which.

DETAILED DESCRIPTION OF THE INVENTION

Figure 1:
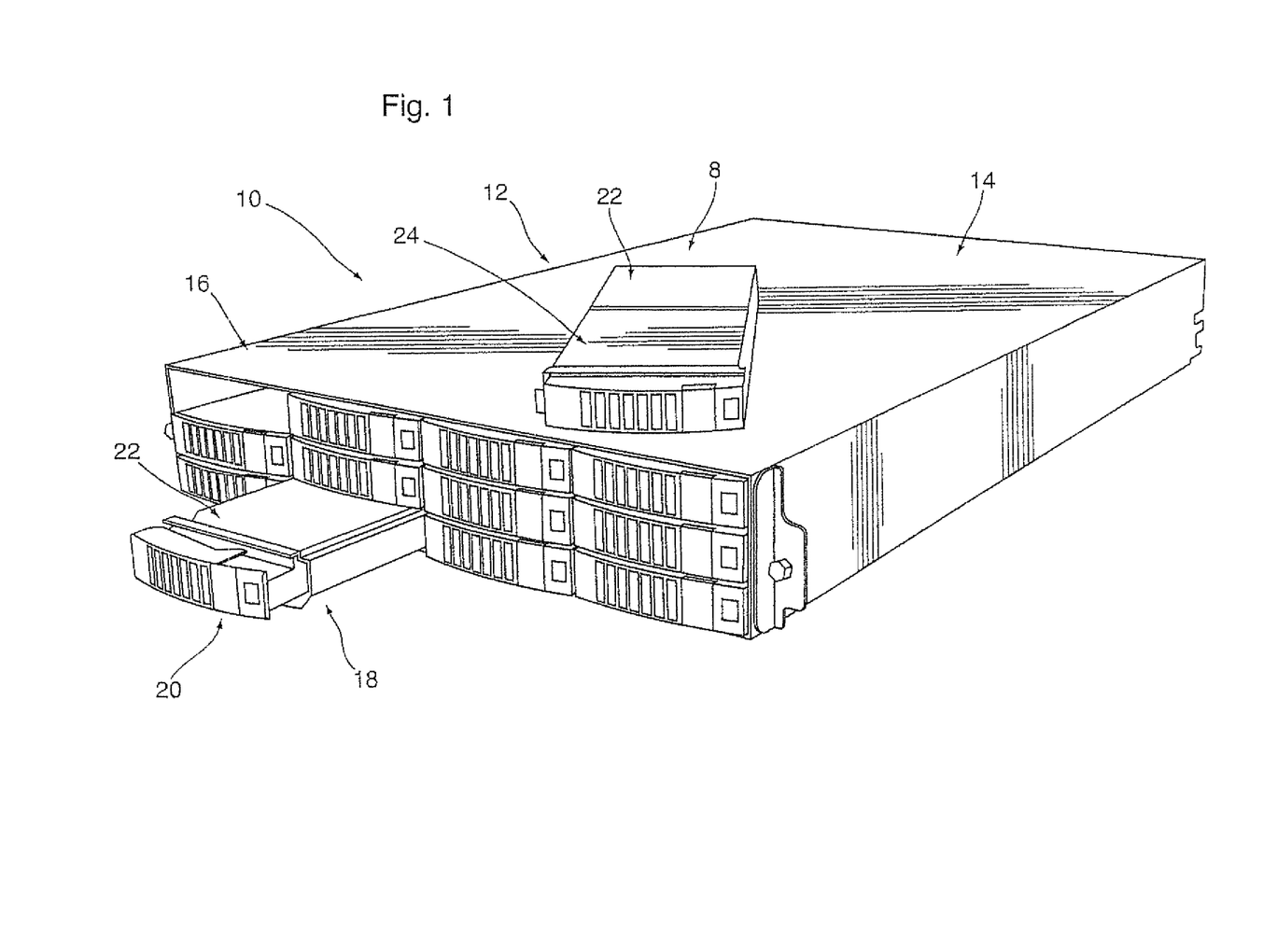
FIG. 1 is a perspective view of a storage enclosure.

Referring initially to FIG. 1, a storage enclosure 10 comprises a chassis 12 having a front portion 16 and a back portion 14. A plurality of carriers 18 are removably housed in the front portion 16 of the chassis 12. Each carrier 18 can be removed or inserted into the front portion 16 of the chassis 12 using an ejector handle 20. Each carrier 18 houses two hard disk drives (HDDs) 22 and 24. When the carrier 18 is properly inserted into the front portion 16 of the chassis 12, each HDD 22 and 24 electrically connects to a midplane in the storage enclosure, which allows one or more controllers in the storage enclosure to access each HDD 22 and 24. Digital data may then be retrieved from or transmitted to each HDD 22 and 24. Controllers, as well as other computing and control equipment, are typically housed in the back portion 14 of the chassis 12.

Figure 2:
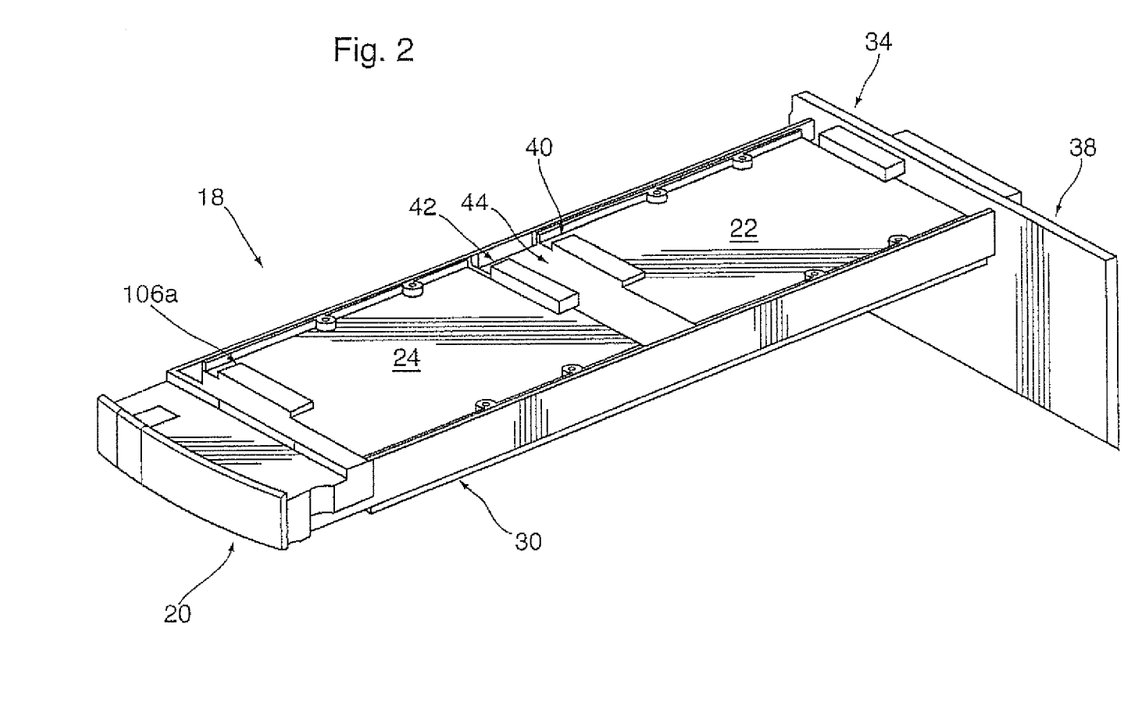
FIG. 2 is a perspective view of the carrier used in the enclosure of FIG. 1.
Figure 3:
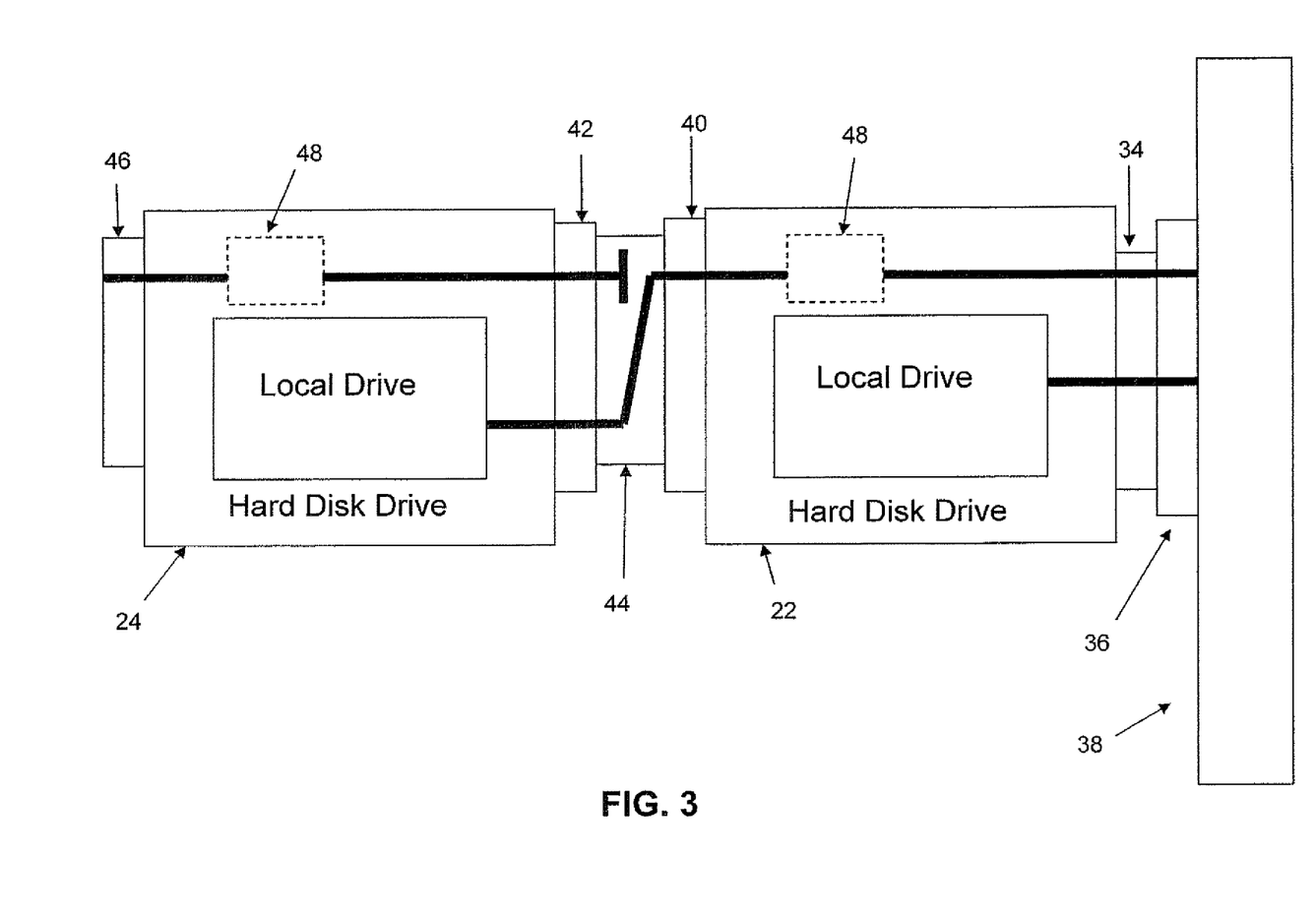
FIG. 3 is a plan view of the pair of hard disk drives shown on the carrier of FIG. 2.

As can be seen more clearly in FIGS. 2 and 3, both HDDs 22 and 24 are directly supported by a frame 30 of the carrier 18 in end to end relationship. The frame 30 may be a pair of side rails connected to the HDDs 22,24, a tray structure to carry the HDDs 22,24, or similar arrangement to support the HDDs.

Each of the HDDs 22,24 includes an input connector 34,42 respectively and an output connector 40,46 respectively. The input connector 34 provided on HDD 22 directly connects to a socket 36 in the midplane 38 of the storage enclosure 10.

The output connector 40 is electrically connected to the input connector 42 of HDD 24 using a small PCB or "paddle board" 44. Each of the input connectors 34,42 have 64 fingers, or electrical contacts, communicating with internal connections in the respective HDD. The fingers on the input connectors 34,42 are divided in to two sets, one of which communicates internally with the HDD and the other of which connects to the output connector 42, 46. The output connectors 40,46 of HDD 22,24 are a standard SAS connector and therefore comprises thirty-two fingers. When the HDDs are connected to another, the thirty-two fingers of the output connector 40 are electrically connected to the thirty-two fingers of the input connector 42 that drive HDD 24, and the other thirty-two fingers of the first set of the input connector 42 are not driven. In this case, the output connector 46 of the HDD 24 is also not driven.

Figure 4:
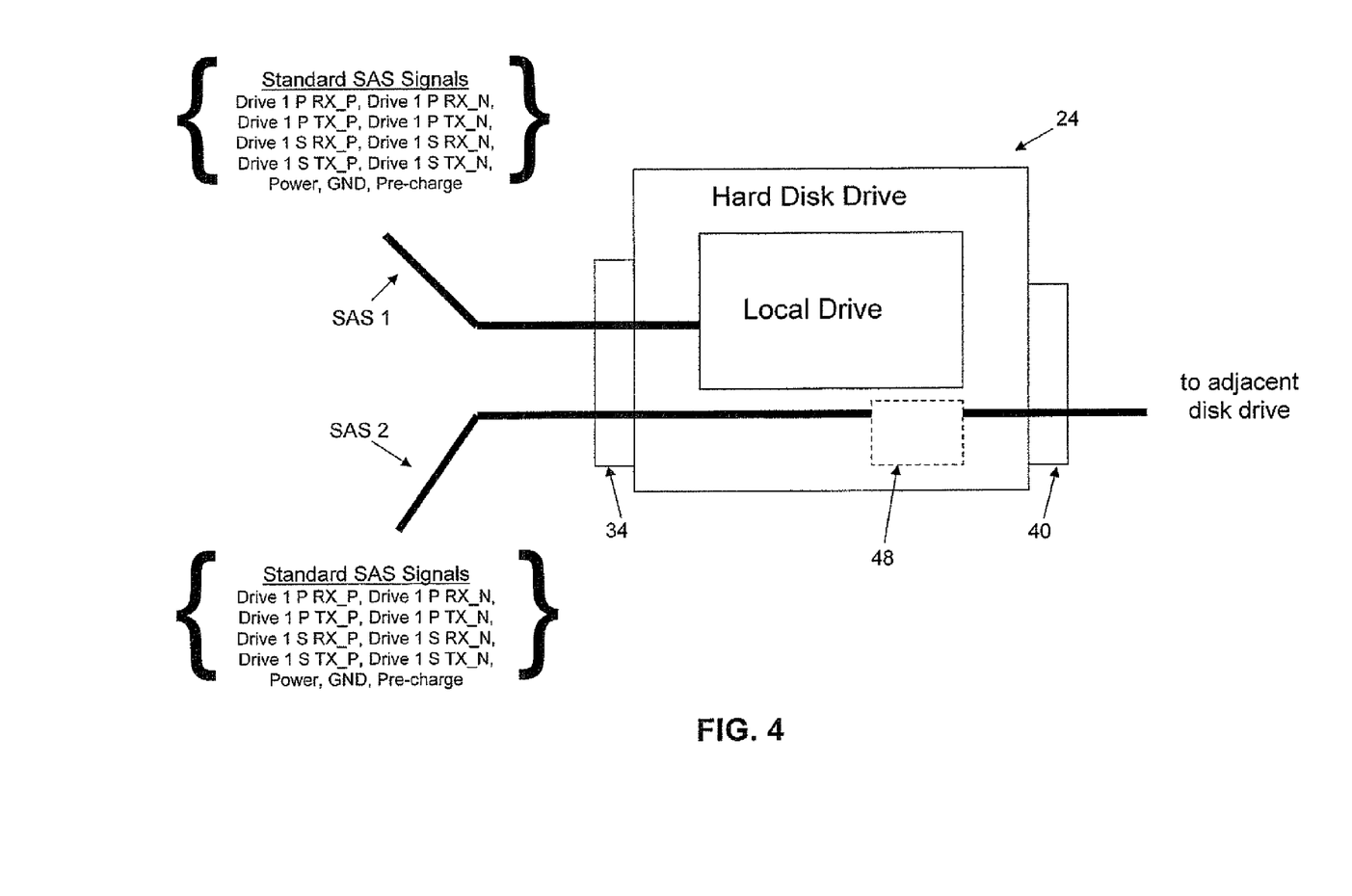
FIG. 4 is schematic showing data connections to a hard disk drive according to one embodiment of the invention.

The connections made to the HDD 22 is shown in FIG. 4. The first set of SAS signals (labelled SAS 1 in FIG. 4) is used to drive the HDD 22 according to the SAS protocol, as is known in the art. The second set of SAS signals (labelled SAS 2 in FIG. 4) is electrically conducted through the HDD 22 to an output connector 40. The output connector 40 is electrically connectable to the input connector 42 of HDD 24. Whilst not necessary in all embodiments, the set of SAS signals being conducted through the HDD 22 to HDD 24 (SAS 2) may be conditioned using a SAS repeater 48 if necessary or if desired. Any appropriate SAS repeater 48 known in the art can be utilized.

Advantageously, the provision of sixty-four fingers on the input connector 34,42, as well as the provision of the output connector 40,46, does not substantially change the size of the HDD 22,24. The connections between the input connections 34,42 and respective outputs 40,46 are conveniently established on a PCB incorporated in the HDDs 22,24 and provision of the connectors 34,42 and 40,46 requires populating additional conductive fingers on the PCB, which does not require a lot of physical space.

Figure 5:
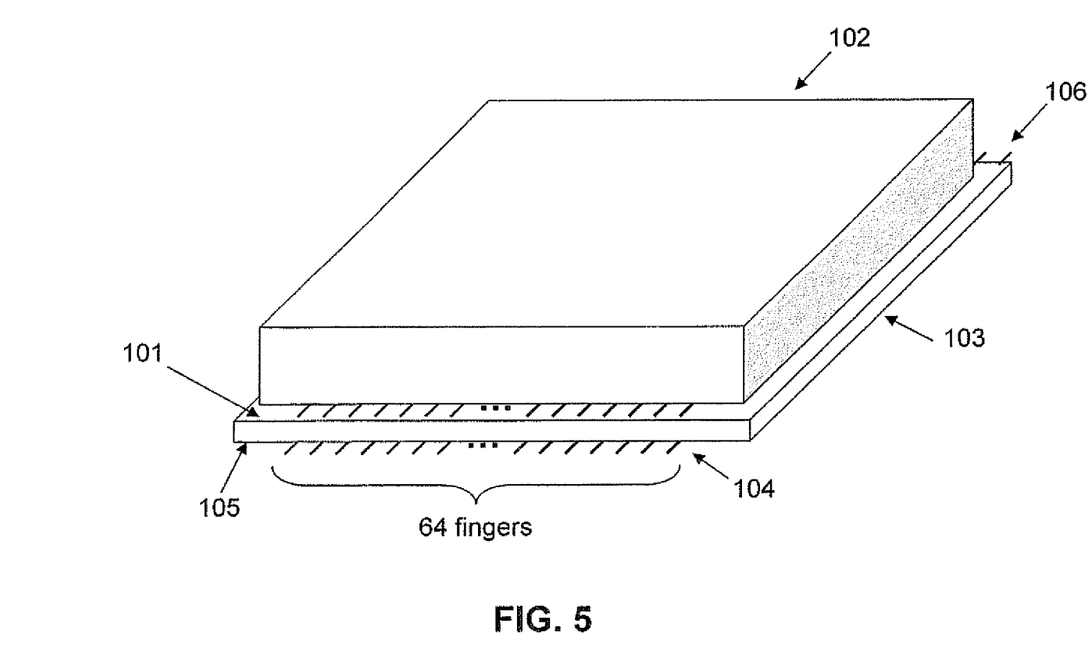
FIG. 5 is a representation of a hard disk drive illustrating the input connector used in the hard disk drive of FIG. 4.

FIG. 5 pictorially illustrates a perspective view of an embodiment of the HDD 22,24 showing the input connector 24,42. HDD 22,24 includes a PCB 50 carrying the drive components and connections for the HDD. An exposed edge of PCB 50 has two sets of connections in the form of having sixty-four fingers that together form the input connector 34,42. A first set of thirty-two fingers of input connector 34,42 are populated on one side 52 of the PCB 50, whereas the other thirty-two fingers are populated on the opposite side 54 of the PCB 50. The thirty-two conductive fingers populated on the one side 52 of the PCB 50 receive the SAS signals (SAS 1) used to drive HDD 22. The thirty-two conductive fingers populated on the opposite side 54 of the PCB 50 receive the additional set of SAS signals (SAS 2) and electrically connect to conductive pathways in the PCB 50 that transmit these signals to the output connector 40,46. The output connector 40,46 comprises thirty-two fingers populated on the one side of PCB 50 at the opposite end of the HDD 22,24. In this manner, the HDDs may be arranged in seriatim with the signals applied uniformly. Alternatively, the conductive pathways may be routed through the paddle board 44 to transfer from the other side to the one side. The PCB 50 therefore provides a single connector for two sets of signals, one of which controls the HDD 24 and the other of which is directed along a pathway from the PCB to the output connector 40,46.

It will be appreciated that the exact number of fingers on the input connectors 34,42 may vary and that, for example, in alternative embodiments, it may be possible to reduce the number of pins/fingers used (for example, by sharing GND and/or power signals).

In the embodiment shown in FIGS. 2 to 5, the output connector 40 of the HDD 22 is electrically connected to the input connector 42 of the HDD 24 using a paddle board 44. It will be appreciated, however, that the output connector 40 of HDD 22 may be electrically connected to the input connector 42 of HDD 24 using other means. For example, output connector 40 may be connected to the input connector 42 using electrical cables or wires, or optionally the two connectors 42 and 44 may be modified to directly mate with each other.

In use, the carrier 18 is inserted into a dedicated slot in the chassis of the storage enclosure 10 using handle 20. The frame 30 of the carrier 18 is received in the slot, and the carrier 18 is pushed into the slot until the input connector 34 of the HDD 22 physically and therefore electrically engages a dedicated socket 36 on the midplane 38. A controller (not shown) electrically connected to the opposite side of the midplane can then be configured to drive one or both of the HDDs 22 and 24 via the SAS protocol. When the controller wishes to communicate with HDD 24, the SAS signals used for communication with HDD 24 are electrically conducted through HDD 22 via connectors 34 and 40 to input connector 42.

Conveniently, a high speed connector is not necessary since the input connector 34 of the HDD 22 directly connects to the socket 36 in the midplane 38. Additionally, the SAS signals used to drive the HDD 24 are transmitted through a dedicated pathway in the HDD 22, therefore eliminating the need for either a relatively bulky underlying PCB or an expensive flex circuit. The only additional part needed for manufacturing the carrier 18 is an electrical conductor to electrically connect the output connector 40 of HDD 22 to the input connector 42 of HDD 24, which in one embodiment is simply an inexpensive paddle board 44.

In the embodiment shown in FIGS. 2 to 5, HDDs 22 and 24 are identical and therefore interchangeable. Therefore, any HDD of the type shown in FIG. 4 may directly connect to the midplane 38 and transmit an additional set of SAS signals to another HDD connected to its output connector.

Although the invention has been described with reference to certain specific embodiments, various modifications thereof will be apparent to those skilled in the art without departing from the spirit and scope of the invention as outlined in the claims appended hereto.

For example, in the embodiment described in FIGS. 2 to 5, it will be appreciated that a controller could instead communicate with HDD 22 and/or HDD 24 using the SATA protocol, since a SAS connector is backwards compatible with SATA signals. In such an embodiment, SAS 1 and/or SAS 2 in FIG. 4 would instead comprise a set of SATA signals, and a set of SATA signals being conducted through HDD 22 to/from HDD 24 may be conditioned using a SATA repeater if necessary or if desired. In this regard, it will be appreciated that if the HDDs 22 and 24 communicate with an external controller using only the SATA protocol, the input connectors 34, 42 and the output connectors 40,46 need not accommodate SAS signals, but can instead be replaced with connectors (having fewer pins/fingers) that only accommodate SATA signals.

It will also be appreciated that, in an alternative embodiment, the output connector 46 of HDD 24 can be left depopulated since it is not required. Although this requires manufacturing HDDs having different numbers of connectors (e.g. HDDs with output connectors and HDDs without output connectors), this allows for cost savings in manufacturing. For example, a manufacturer of a given HDD can leave the output connector depopulated if the HDD is not required to pass through a set of SAS/SATA signals (e.g. if the HDD is utilized in a single HDD carrier or if the HDD is utilized only as HDD 24 in FIG. 2), and the manufacturer can populate the output connector only for HDDs required to pass through a set of SAS/SATA signals.

Figure 6:
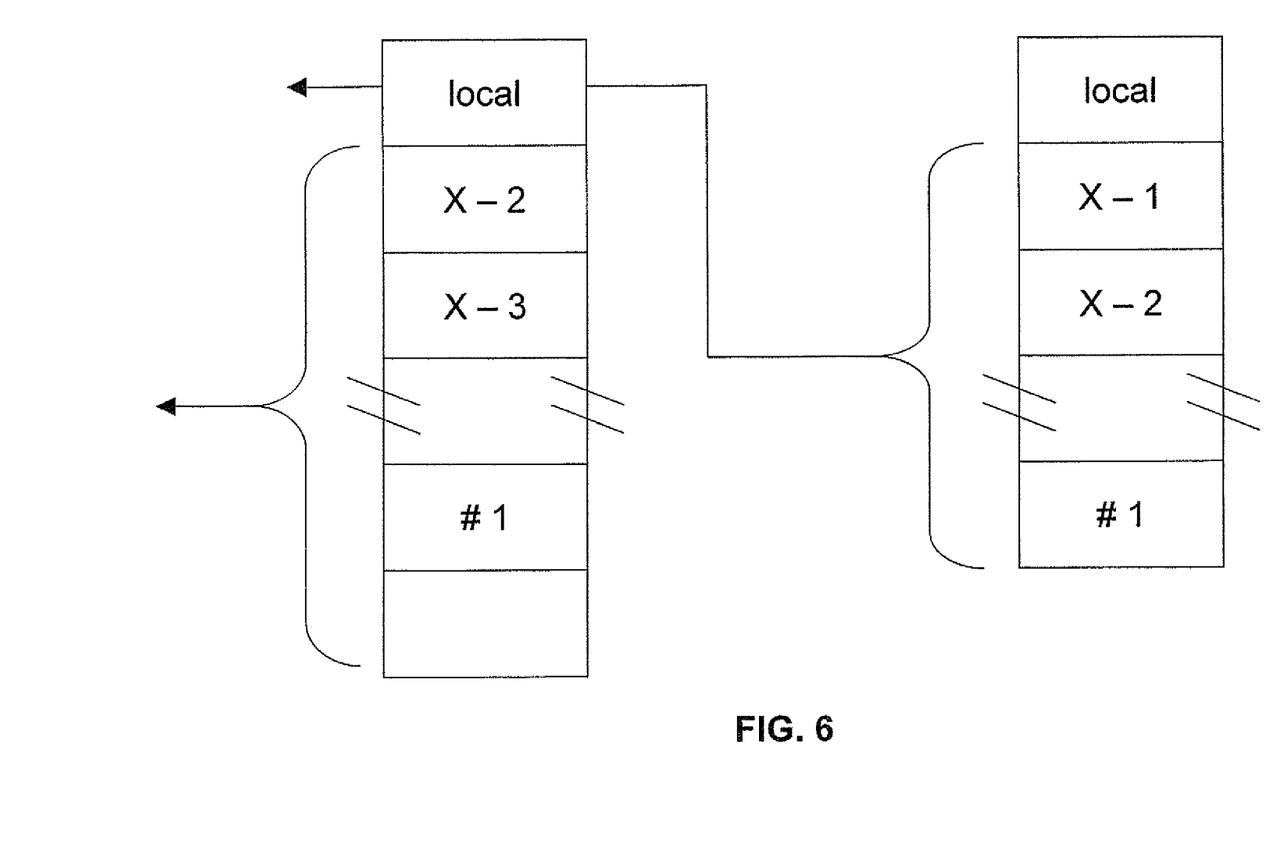
FIG. 6 is a schematic representation of a plurality of disk drives connected in seriatim.

More generally, it will be appreciated that the invention is not limited to HDDs, as in the embodiments shown in FIGS. 2 to 5, but applies generally to the family of mass storage devices. Examples of other mass storage devices include optical drives and solid state memory based media that emulate HDDs. Moreover, it is contemplated that the mass storage device 22 can be configured to have an input connector 34 that accommodates x sets of input signals for storing and retrieving information in x mass storage devices, where x≥2. One set of input signals is used to drive mass storage device 22, while the other x−1 sets of input signals are transmitted through the mass storage device 22 to a neighbouring mass storage device 24 via an output connector 40. This would allow x mass storage devices to be placed in tandem on a carrier, with only the first mass storage device directly connected to the midplane 38. For example, in the embodiment shown in FIG. 4, and as shown schematically in FIG. 6, HDD 22 can be configured to have an input connector 34 that accommodates x sets of SAS/SATA signals. One set of SAS/SATA signals is used to drive the HDD 22, while and the other x−1 sets of SAS/SATA signals are transmitted through the HDD 22 to neighbouring HDD 24 via output connector 40. The contact signals for the next HDD are provided on the fingers connected internally to that HDD and the balance connected to the output connector.

The set of signals fort the next HDD are directed locally and the balance provided to the output. In this manner, the HDDs are arranges in seriatim with an ordered chain of control paths. It will be appreciated, however, that the above-described embodiments are particularly well suited for the case of a dual hard drive carrier.

Additionally, it is also contemplated that the invention need not be limited to a mass storage device 22 that communicates with an external controller according to the SAS or SATA protocol. Other transmission protocols may instead be used, for example, SCSI or fibre channel (FC). It will be appreciated that the number of pins required on the input connector 36 and output connector 40 would need to be modified appropriately to suit the transmission protocol.

What is claimed is:

1. A mass storage device comprising an input connector for receiving both a first set of data signals and a second set of data signals, the first set of data signals being used to effect storage and retrieval of information on said mass storage device; and a pathway for conducting said second set of data signals from said input connector to an output connector of said mass storage device, the second set of data signals being used to effect storage and retrieval of information on an adjacent mass storage device when said adjacent mass storage device is connected to said output connector.

2. The mass storage device of claim 1 wherein said mass storage device is a hard disk drive, said first set of data signals comprises a set of SAS or SATA signals, and said second set of data signals comprises another set of SAS or SATA signals.

3. The mass storage device according to claim 1 including a signal repeater in said pathway.

4. The mass storage device of claim 1 wherein said pathway is formed on a printed circuit board incorporated in said mass storage device.

5. The mass storage device of claim 4 wherein said input connector includes a first array of connectors is provided to receive said first set and said second set of data signals and said output connector includes a second array of connectors.

6. The mass storage device of claim 5 wherein said arrays are on oppositely directed faces of said mass storage device.

7. The mass storage device of claim 6 wherein said first array includes a set of connectors in a predetermined position in said first array and said second array includes a set of connectors located so as to be in said predetermined position on an adjacent mass storage device.

8. A mass storage assembly comprising a carrier, a plurality of mass storage devices on said carrier, each of said devices having an input connector to receive data signals to effect storage retrieval of information on said devices, at least one of said devices having an output connector connectible to an input connector of another of said devices, said input connector of said one of said devices having a first set of connections to receive a first set of data signals used to effect storage and retrieval of information from said one device and a second set of connections connected to a pathway to transfer data signals from said input connector to said output connector of said one device.

9. The mass storage assembly according to claim 8 wherein said output connector of said one of said devices is connected to said input connector of another of said devices by a printed circuit board.

10. The mass storage assembly of claim 8 wherein said pathway is provided on a printed circuit board incorporated in to said one mass storage device.

11. The mass storage assembly of claim 8 including a signal repeater in said pathway.

12. The mass storage assembly of claim 8 wherein said mass storage devices are arranged on said carrier in seriatim and said output connector of said one of said devices is aligned with said input connector of another of said devices.

13. The mass storage device of claim 12 wherein said output connector of said one device is connected to said input connector of said other of said devices by a printed circuit board.

14. The mass storage device of claim 8 wherein said first set of data signals and said second set of data signals each comprise a SAS or SATA compatible data set.

15. A storage unit for storing digital data on a plurality of mass storage devices, said unit having a midplane having a plurality of midplane connectors to connect said mass storage devices to controllers to effect storage and retrieval of information, each of said midplane connectors having a plurality of sets of data signals supplied thereto, at least one of said mass storage units connected to said midplane connector having an input connector to receive said sets of data signals from one of said midplane connectors, said at least one mass storage device having an output connector for connection to an adjacent mass storage device, and a pathway to connect said input connector to said output connector, whereby a first set of said data signals is directed to effect data storage and retrieval on said one mass storage device and said second set of data signals is directed to said output connector to effect data storage and retrieval from said adjacent mass storage device.

* * * * *